(12) United States Patent
Mc Nabb

(10) Patent No.: US 6,546,974 B1
(45) Date of Patent: Apr. 15, 2003

(54) STUMP REMOVAL TOOL

(76) Inventor: Michael R. Mc Nabb, 1 Savant Ct., Manchester, MO (US) 63011

( * ) Notice: Subject to any disclaimer, the term of this patent is extended or adjusted under 35 U.S.C. 154(b) by 0 days.

(21) Appl. No.: 10/056,449

(22) Filed: Jan. 25, 2002

(51) Int. Cl.[7] ............................................. A01G 23/06
(52) U.S. Cl. .................. 144/24.12; 144/218; 144/219; 144/221; 144/240; 83/592; 83/672; 408/135
(58) Field of Search ................ 83/592, 651.1, 83/665, 666, 672, 855; 144/24.12, 218, 219, 221, 236, 34.1, 231, 240; 408/135, 236; 407/59, 62, 63; 37/302

(56) References Cited

U.S. PATENT DOCUMENTS

| | | | |
|---|---|---|---|
| 1,137,603 A | | 4/1915 | Goodwin |
| 1,411,104 A | * | 3/1922 | Hughes ........................ 408/135 |
| 1,461,376 A | * | 7/1923 | Bartlett ........................ 144/219 |
| 3,457,976 A | * | 7/1969 | Andersson et al. .......... 144/221 |
| 4,697,625 A | | 10/1987 | Bolton |
| 4,909,291 A | * | 3/1990 | Tremblay ................... 144/34.1 |
| 4,936,361 A | * | 6/1990 | Mercier et al. ............. 144/221 |
| 5,115,845 A | | 5/1992 | Hooser |
| 5,127,453 A | * | 7/1992 | Wingate-Hill et al. ...... 144/221 |
| D340,248 S | | 10/1993 | Brady |
| 5,915,430 A | | 6/1999 | Hooser et al. |
| 5,956,894 A | | 9/1999 | Eldridge |

FOREIGN PATENT DOCUMENTS

| | | | |
|---|---|---|---|
| DE | 262338 | * 7/1913 | ................. 144/221 |

\* cited by examiner

*Primary Examiner*—W. Donald Bray

(57) ABSTRACT

A stump removal tool for boring around a stump at ground level. The stump removal tool includes an elongate member having a first end, a second end and outer peripheral wall extending between the first and second ends. The elongate member has a generally circular cross-section taken transversely to a longitudinal axis of the elongate member. A connecting portion is attached to and extends away from the first end of the elongate member. The connecting portion is removably coupled to a power tool. A plurality of teeth is attached to an outer surface of the peripheral wall. The teeth are spaced from each other and are positioned in a pattern extending from the first end to the second end. The elongate member is attached to the power tool and rotated such that the teeth may be used for boring through a stump.

10 Claims, 5 Drawing Sheets

STUMP REMOVAL TOOL

BACKGROUND OF THE INVENTION

1. Field of the Invention

The present invention relates to cutting tools and more particularly pertains to a new stump removal tool for boring around a stump at ground level.

2. Description of the Prior Art

The use of cutting tools is known in the prior art. More specifically, cutting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,956,894; U.S. Pat. No. 5,115,845; U.S. Pat. No. 5,915,430; U.S. Des. Pat. No. 340,248; and U.S. Pat. No. 1,137,603.

While these devices fulfill their respective, particular objectives and requirements, the aforementioned patents do not disclose a new stump removal tool. The inventive device includes an elongate member having a first end, a second end and outer peripheral wall extending between the first and second ends. The elongate member has a generally circular cross-section taken transversely to a longitudinal axis of the elongate member. A connecting portion is attached to and extends away from the first end of the elongate member. The connecting portion is removably coupled to a power tool. A plurality of teeth is attached to an outer surface of the peripheral wall. The teeth are spaced from each other and are positioned in a pattern extending from the first end to the second end. The elongate member is attached to the power tool and rotated such that the teeth may be used for boring through a stump.

In these respects, the stump removal tool according to the present invention substantially departs from the conventional concepts and designs of the prior art, and in so doing provides an apparatus primarily developed for the purpose of boring around a stump at ground level.

SUMMARY OF THE INVENTION

In view of the foregoing disadvantages inherent in the known types of cutting tools now present in the prior art, the present invention provides a new stump removal tool construction wherein the same can be utilized for boring around a stump at ground level.

The general purpose of the present invention, which will be described subsequently in greater detail, is to provide a new stump removal tool apparatus and method which has many of the advantages of the cutting tools mentioned heretofore and many novel features that result in a new stump removal tool which is not anticipated, rendered obvious, suggested, or even implied by any of the prior art cutting tools, either alone or in any combination thereof.

To attain this, the present invention generally comprises an elongate member having a first end, a second end and outer peripheral wall extending between the first and second ends. The elongate member has a generally circular cross-section taken transversely to a longitudinal axis of the elongate member. A connecting portion is attached to and extends away from the first end of the elongate member. The connecting portion is removably coupled to a power tool. A plurality of teeth is attached to an outer surface of the peripheral wall. The teeth are spaced from each other and are positioned in a pattern extending from the first end to the second end. The elongate member is attached to the power tool and rotated such that the teeth may be used for boring through a stump.

There has thus been outlined, rather broadly, the more features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new stump removal tool apparatus and method which has many of the advantages of the cutting tools mentioned heretofore and many novel features that result in a new stump removal tool which is not anticipated, rendered obvious, suggested, or even implied by any of the prior art cutting tools, either alone or in any combination thereof.

It is another object of the present invention to provide a new stump removal tool which may be easily and efficiently manufactured and marketed.

It is a further object of the present invention to provide a new stump removal tool which is of a durable and reliable construction.

An even further object of the present invention is to provide a new stump removal tool which is susceptible of a low cost of manufacture with regard to both materials and labor, and which accordingly is then susceptible of low prices of sale to the consuming public, thereby making such stump removal tool economically available to the buying public.

Still yet another object of the present invention is to provide a new stump removal tool which provides in the apparatuses and methods of the prior art some of the advantages thereof, while simultaneously overcoming some of the disadvantages normally associated therewith.

Still another object of the present invention is to provide a new stump removal tool for boring around a stump at ground level.

Yet another object of the present invention is to provide a new stump removal tool which includes an elongate member having a first end, a second end and outer peripheral wall extending between the first and second ends. The elongate member has a generally circular cross-section taken transversely to a longitudinal axis of the elongate member. A connecting portion is attached to and extends away from the first end of the elongate member. The connecting portion is removably coupled to a power tool. A plurality of teeth is attached to an outer surface of the peripheral wall. The teeth are spaced from each other and are positioned in a pattern extending from the first end to the second end. The elongate member is attached to the power tool and rotated such that the teeth may be used for boring through a stump.

Still yet another object of the present invention is to provide a new stump removal tool that allows a user to shear off a stump at or below ground level such that only the roots of the stump remain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be; better understood and objects other than those set forth above will become apparent when consideration is given to the following detailed description thereof. Such description makes reference to the annexed drawings wherein.

DESCRIPTION OF THE PREFERRED EMBODIMENT

Figure 1:
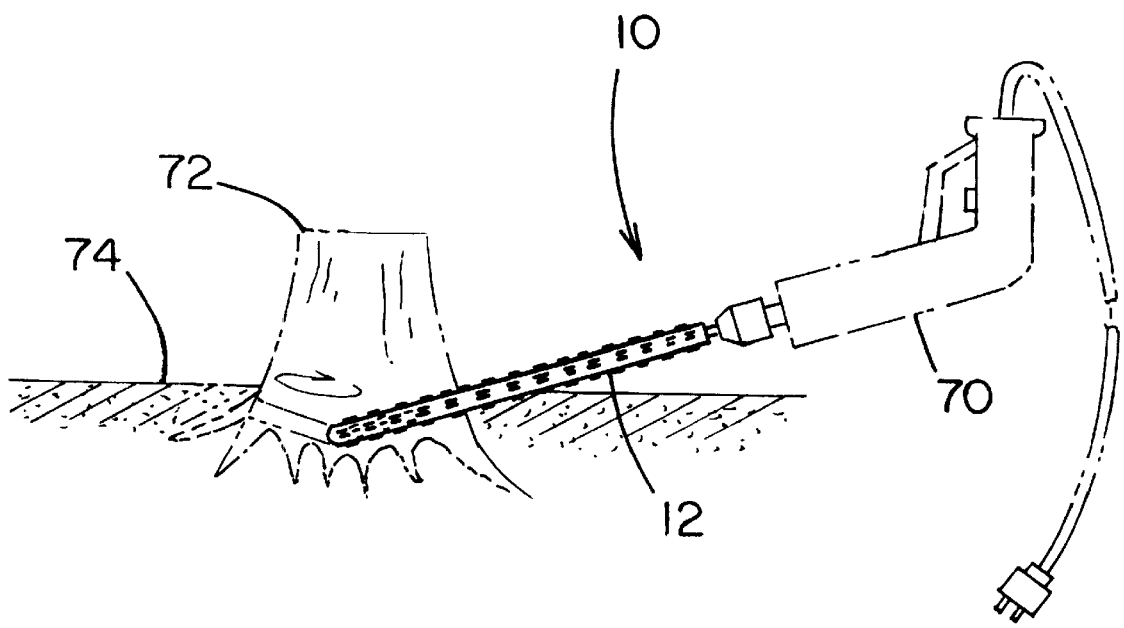
FIG. 1 is a schematic side view of a new stump removal tool according to the present invention.

With reference now to the drawings, and in particular to FIGS. 1 through 11 thereof, a new stump removal tool embodying the principles and concepts of the present invention and generally designated by the reference numeral 10 will be described.

As best illustrated in FIGS. 1 through 11, the stump removal tool 10 generally comprises an elongate member 12 having a first end 14, a second end 16 and outer peripheral wall 18 extending between the first 14 and second 16 ends. The elongate member 12 has a generally circular cross-section taken transversely to a longitudinal axis of the elongate member 12. A connecting portion 20 is attached to and extends away from the first end 14 of the elongate member 12. The connecting portion 20 is removably coupled to a conventional power tool 70 which receives conventional bits.

A rod 22 is attached to the second end 16 of the elongate member 12 and is generally co-axial with a longitudinal axis of the elongate member 12. An annular shoulder 24 extends around the rod 22 and abuts the second end 16 of the elongate member 12. The rod 22 is threaded.

Figure 5:
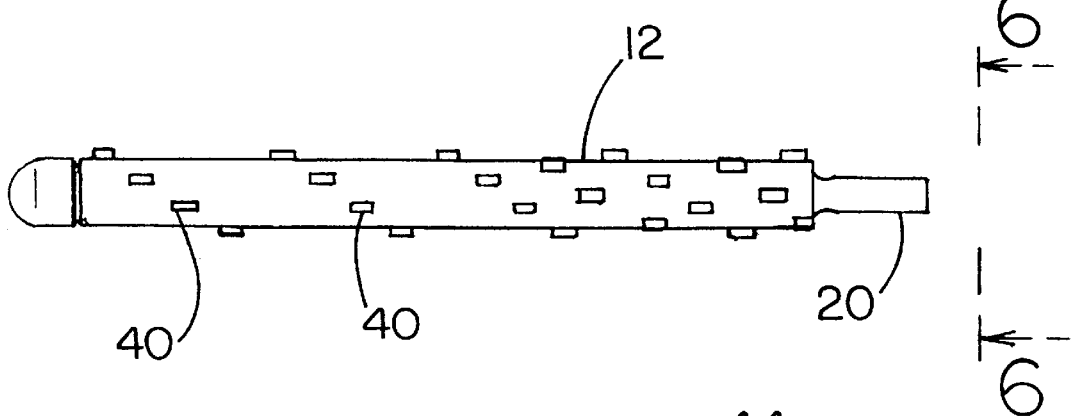
FIG. 5 is a schematic side view of the present invention.
Figure 7:
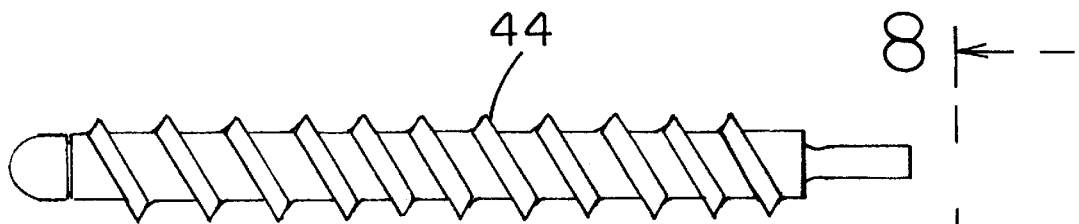
FIG. 7 is a schematic side view of the present invention.
Figure 9:
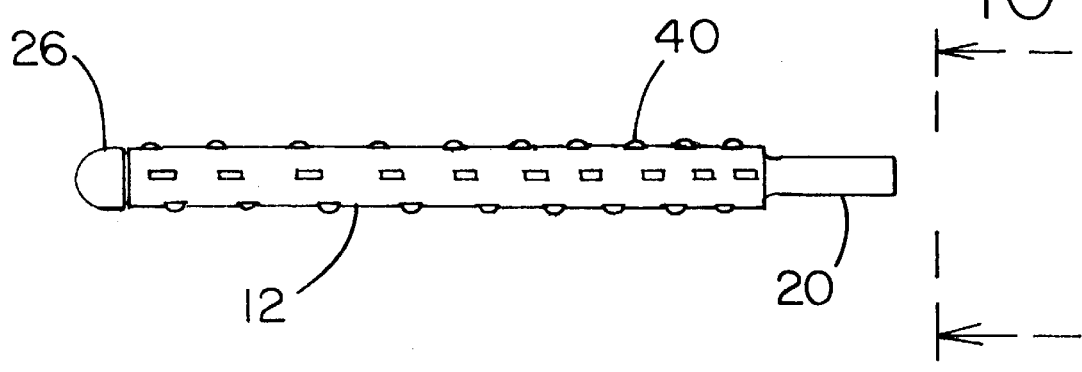
FIG. 9 is a schematic side view of the present invention.

A cover 26 has an end wall 28 and a peripheral wall 30 extending away from the end wall 28. The end wall 28 has a hole 32 therein for receiving the rod 22 such that the cover 26 is extendable over the second end 14 of the elongate member 12. A plurality of ball bearings 34 is positioned around the rod 22 and is positioned between the rod and the peripheral wall 30 of the cover 26. A washer 36 is positioned between the ball bearings 34 and the end wall 28 such that the ball bearings 34 are between the washer 36 and the annular shoulder 24. A fastener 38 is positioned on the rod 22 between a free end 23 of the rod 22 and the end wall 28 such that the cover 26 is removably attached to the rod 22. The end wall 28 is generally dome shaped. The cover 26 may rotate with respect to the elongate member 12. FIGS. 5 and 7 show a cover 26 which may be attached to the elongate member, or may be rotatable.

Figure 2:
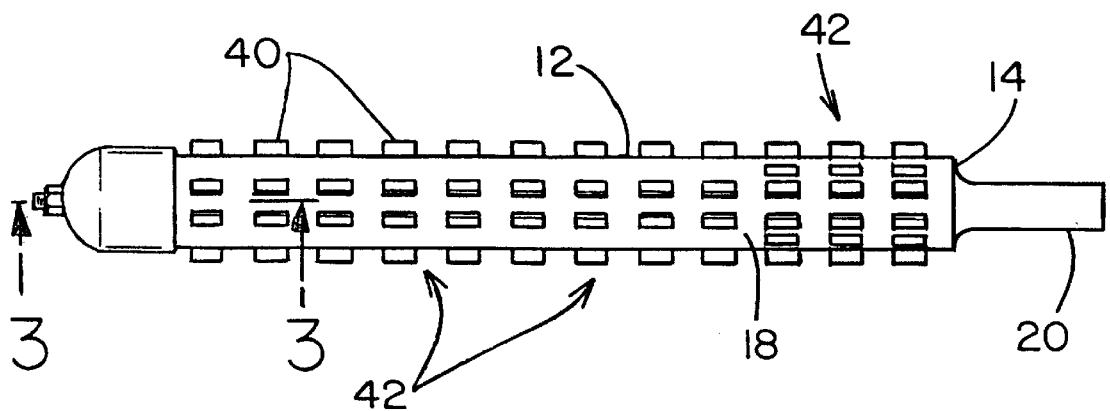
FIG. 2 is a schematic side view of the present invention.
Figure 3:
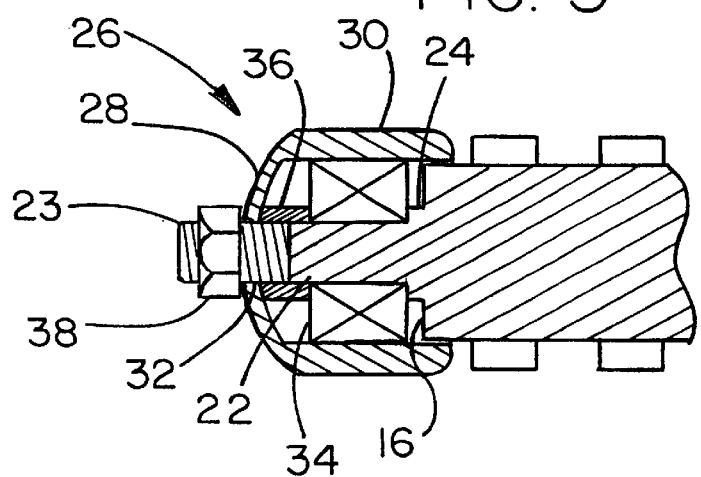
FIG. 3 is a schematic cross-sectional view taken along line 3—3 of the present invention.
Figure 4:
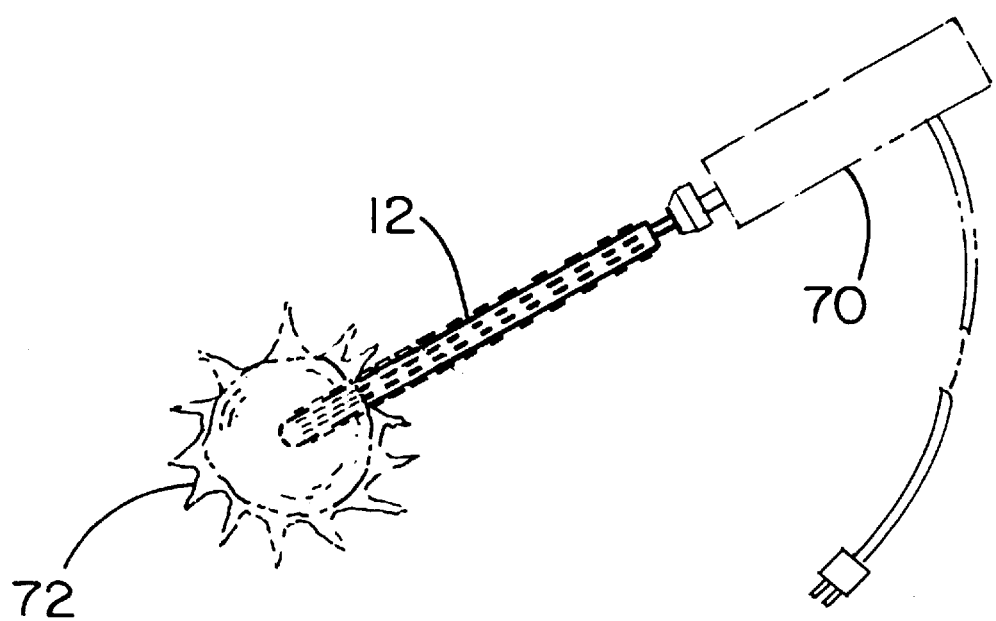
FIG. 4 is a schematic top view of the present invention.
Figure 6:
FIG. 6 is a schematic end view taken along line 6—6 of the present invention.
Figure 8:
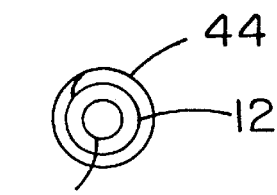
FIG. 8 is a schematic end view taken along line 8—8 of the present invention.
Figure 10:
FIG. 10 is a schematic end view taken along line 10—10 of the present invention.
Figure 11:
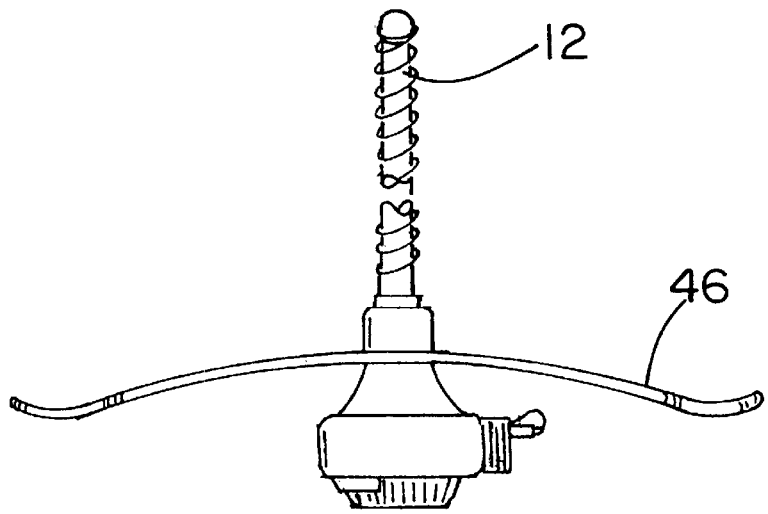
FIG. 11 is a schematic side view of the present invention.

Each of a plurality of teeth 40 is attached to an outer surface of the peripheral wall 18. In FIG. 2, the teeth 40 are arranged in sets 42 of teeth extending around the rod 12. The sets 42 are spaced from each other and extend from the first end 14 to the second end 16 of the elongate member 12. The sets 42 positioned nearer the first end 14 have a greater number of teeth therein than the sets positioned nearer the second end 16 of the elongate member. A second embodiment, shown in FIG. 6, provides the teeth 40 in a helical pattern extending from the first end to the second end. The concentration of number of teeth 40 increases from the second end 16 to the first end 14. A third embodiment, shown in FIG. 7, has a threaded peripheral wall 44 instead of teeth 42. The varying teeth as shown in FIGS. 6 and 10 and may include scalloped teeth as in FIG. 10 or jagged teeth in FIG. 6 for tearing a stump 72. FIG. 11 shows a handle attachment 46 for larger stumps.

In use, a hole is driven into a stump 72 where the stump 72 meets the ground surface 74. The elongate member 12 is attached to the power tool 70, such as an electric drill. The elongate member 12 is extended into the hole and rotated by the power tool such that the teeth 40 may be used for boring through a stump 72. The elongate member 12 is moved in a circle about the axis of the stump 72 so that the teeth 40 cut around the stump near the ground surface 74. Once the user has completely moved around the stump 72, the stump 72 is then removed leaving only the roots behind.

As to a further discussion of the manner of usage and operation of the present invention, the same should be apparent from the above description. Accordingly, no further discussion relating to the manner of usage and operation will be provided. readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stump removal tool for removably coupling to a power tool for rotating said tool, said tool comprising:

an elongate member having a first end, a second end and outer peripheral wall extending between said first and second ends, said elongate member having a generally circular cross-section taken transversely to a longitudinal axis of said elongate member, a connecting portion being attached to and extending away from said first end of said elongate member, said connecting portion being removably coupled to said power tool;

a plurality of teeth being attached to an outer surface of said peripheral wall, said teeth being spaced from each other and being positioned in a pattern extending from said first end to said second end;

wherein said elongate member is attached to said power tool and rotated such that said teeth may be used for boring through a stump:

a rod being attached to said second end of said elongate member and being generally co-axial with a longitudinal axis of said elongate member, said rod being threaded; and a cover having an end wall and a peripheral wall extending away from said end wall, said end wall having a hole therein for receiving said rod such that said cover is extendable over said second end of said elongate member, a fastener being positioned on said rod between a free end of said rod and said end wall such that said cover is removably attached to said rod.

2. The stump removal tool as in claim 1, further including a plurality of ball bearings being positioned around said rod and being positioned between said rod and said cover, wherein said cover may rotate with respect to said elongate member.

3. The stump removal tool as in claim 2, further including an annular shoulder extending around said rod and abutting said second end of said elongate member, a washer being positioned between said ball bearings and said end wall such that said ball bearings are between said washer and said annular shoulder.

4. The stump removal tool as in claim 1, wherein said end wall is generally dome shaped.

5. The stump removal tool as in claim 1, wherein said teeth are arranged in sets of teeth extending around said rod, said sets being spaced from each other and extending from said first end to said second end of said elongate member.

6. The stump removal tool as in claim 5, wherein said sets positioned nearer said first end have a greater number of teeth therein than said sets positioned nearer said second end of said elongate member.

7. The stump removal tool as in claim 1, wherein said teeth are arranged in a helical pattern extending from said first end to said second end.

8. The stump removal tool as in claim 7, wherein there a concentration of teeth increases from said second end to said first end of said elongate member.

9. A stump removal tool for removably coupling to a power tool for rotating said tool, said tool comprising:

an elongate member having a first end, a second end and outer peripheral wail extending between said first and second ends, said elongate member having a generally circular cross-section taken transversely to a longitudinal axis of said elongate member, a connecting portion being attached to and extending away from said first end of said elongate member, said connecting portion being removably coupled to said power tool, said outer surface of said elongate member being threaded;

a cover being positioned over said second end of said elongate member, said cover having a domed surface extending away from said elongate member;

a plurality of teeth being attached to an outer surface of said peripheral wall; and wherein said elongate member is attached to said power tool and rotated such that said teeth may be used for boring through a stump.

10. A stump removal tool for removably coupling to a power tool for rotating said tool, said tool comprising:

an elongate member having a first end, a second end and outer peripheral wall extending between said first and second ends, said elongate member having a generally circular cross-section taken transversely to a longitudinal axis of said elongate member, a connecting portion being attached to and extending away from said first end of said elongate member, said connecting portion being removably coupled to said power tool;

a rod being attached to said second end of said elongate member and being generally co-axial with a longitudinal axis of said elongate member, an annular shoulder extending around said rod and abutting said second end of said elongate member, said rod being threaded;

a cover having an end wall and a peripheral wall extending away from said end wall, said cover being positionable over said rod, said end wall having a hole therein for receiving said rod such that said cover is extendable over said second end of said elongate member, a plurality of ball bearings being positioned around said rod and being positioned between said rod and said cover, a washer being positioned between said ball bearings and said end wall such that said ball bearings are between said washer and said annular shoulder, a fastener being positioned on said rod between a free end of said rod and said end wall such that said cover is removably attached to said rod, said end wall being generally dome shaped, wherein said cover may rotate with respect to said elongate member;

a plurality of teeth being attached to an outer surface of said peripheral wall, said teeth being arranged in sets of teeth extending around said rod, said sets being spaced from each other and extending from said first end to said second end of said elongate member, said sets positioned nearer said first end having a greater number of teeth therein than said sets positioned nearer said second end of said elongate member; and wherein said elongate member is attached to said power tool and rotated such that said teeth may be used for boring through a stump.

* * * * *